United States Patent
Ishihara

(10) Patent No.: US 12,272,954 B2
(45) Date of Patent: Apr. 8, 2025

(54) POWER STORAGE SYSTEM AND GRID CONTROL SYSTEM

(71) Applicant: Mitsubishi Electric Corporation, Tokyo (JP)

(72) Inventor: Hiroki Ishihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/288,826

(22) PCT Filed: May 10, 2021

(86) PCT No.: PCT/JP2021/017675
§ 371 (c)(1),
(2) Date: Oct. 30, 2023

(87) PCT Pub. No.: WO2022/239057
PCT Pub. Date: Nov. 17, 2022

(65) Prior Publication Data
US 2024/0204525 A1    Jun. 20, 2024

(51) Int. Cl.
*H02J 3/32* (2006.01)
*H02J 3/02* (2006.01)
(Continued)

(52) U.S. Cl.
CPC .................... *H02J 3/32* (2013.01); *H02J 3/02* (2013.01); *H02J 3/16* (2013.01); *H02J 7/0013* (2013.01)

(58) Field of Classification Search
None
See application file for complete search history.

(56) References Cited

U.S. PATENT DOCUMENTS

2014/0292080 A1  10/2014  Markowz et al.
2015/0092462 A1*  4/2015  Ohori ................... H02J 3/48
                                                363/71

(Continued)

FOREIGN PATENT DOCUMENTS

JP    5549994 B2    7/2014
JP    5558172 B2    7/2014
(Continued)

OTHER PUBLICATIONS

Extended European Search Report issued Jun. 12, 2024, in corresponding European Patent Application No. 21941791.2, 10pp.
(Continued)

*Primary Examiner* — Jared Fureman
*Assistant Examiner* — Aqeel H Bukhari
(74) *Attorney, Agent, or Firm* — XSENSUS LLP

(57) ABSTRACT

A power converter interchanges electric power between a power storage device and a power grid as the power storage device is charged and discharged. A control device controls active power inputted and outputted between the power grid and the power converter. The control device generates a command value indicating an amount of output of active power for increase in grid frequency or an amount of input of active power for lowering in grid frequency, in accordance with an amount of frequency variation calculated from a frequency detection value of the power grid. Furthermore, the control device restricts output of active power in accordance with the command value when the frequency detection value is larger than a frequency reference value of the power grid and restricts input of active power in accordance with the command value when the frequency detection value is smaller than the frequency reference value.

13 Claims, 10 Drawing Sheets

(51) Int. Cl.
*H02J 3/16* (2006.01)
*H02J 7/00* (2006.01)

(56) References Cited

U.S. PATENT DOCUMENTS

2016/0359364 A1* 12/2016 Kanan .................... G05F 1/66
2019/0280521 A1    9/2019 Lundstrom et al.

FOREIGN PATENT DOCUMENTS

JP        6232899 B2    11/2017
JP     2019-003454 A     1/2019

OTHER PUBLICATIONS

International Search Report and Written Opinion mailed on Jul. 6, 2021, received for PCT Application PCT/JP2021/017675, filed on May 10, 2021, 8 pages including English Translation.

* cited by examiner (a)

(b)

POWER STORAGE SYSTEM AND GRID CONTROL SYSTEM

CROSS-REFERENCE TO RELATED APPLICATION

This application is based on PCT filing PCT/JP2021/017675, filed May 10, 2021, the entire contents of which are incorporated herein by reference.

TECHNICAL FIELD

The present disclosure relates to a power storage system and a grid control system.

BACKGROUND ART

With widespread use of renewable energy over the future, the number of thermal power generators is estimated to decrease and inertia of power grids is expected to increasingly lower toward the future. In a grid low in inertia, a grid frequency tends to vary with troubles on a generator side or variation in load.

Japanese Patent No. 6232899 (PTL 1) proposes a power compensation device that suppresses and compensates for variation in grid frequency by input and output of active power to and from a power grid with the use of electric power in a power storage device (electric power storage device). PTL 1 describes reduction in power loss of the power storage device by change of a control constant for suppression of variation in grid frequency based on a frequency difference.

CITATION LIST

Patent Literature

PTL 1: Japanese Patent No. 6232899

SUMMARY OF INVENTION

Technical Problem

In the power compensation device in PTL 1, an active power command value is calculated by multiplication of a frequency difference that has passed through a high pass filter by a gain. In other words, the active power command value is set to suppress a variation component of the grid frequency.

In PTL 1, the frequency variation component obtained by the high pass filter can be compensated for, whereas relation of values between a detected value of the grid frequency and a frequency reference value (for example, 60 [Hz]) is not reflected on active power. Therefore, control output (active power) for suppression of the frequency variation component may be set to vary the grid frequency in a direction away from the frequency reference value.

For example, when the grid frequency abruptly lowers within a range not smaller than the frequency reference value from a state where it is higher than the frequency reference value, the power compensation device outputs active power in a direction of increase in grid frequency. Such output of active power, however, is applied in a direction in which the grid frequency is away from the frequency reference value, and hence further destabilization of the grid is a concern.

The present disclosure was made to solve such a problem, and an object of the present disclosure is to realize grid frequency control to suppress variation in frequency by suppression of deviation from a frequency reference value.

Solution to Problem

According to one aspect of the present disclosure, a power storage system interconnected to a power grid is provided. The power storage system includes a power storage device, a power converter, and a control device. The power converter is connected between the power storage device and the power grid to interchange electric power between the power storage device and the power grid. The control device controls active power inputted and outputted between the power grid and the power converter as the power storage device is charged and discharged. The control device includes a frequency detector, a frequency variation amount calculator, a control calculator, and a restriction unit. The frequency detector generates a frequency detection value of the power grid. The frequency variation amount calculator calculates an amount of frequency variation in the power grid from the frequency detection value obtained by the frequency detector. The control calculator generates a command value indicating an amount of output of active power for increase in grid frequency or an amount of input of the active power for lowering in grid frequency, in accordance with the amount of frequency variation. When the control calculator generates the command value indicating the amount of output of the active power while the frequency detection value is larger than a predetermined frequency reference value of the power grid, the restriction unit restricts output of the active power in accordance with the command value. Furthermore, when the control calculator generates the command value indicating the amount of input of the active power while the frequency detection value is smaller than the frequency reference value, the restriction unit restricts input of the active power in accordance with the command value.

According to another aspect of the present disclosure, a grid control system is provided. The grid control system includes a plurality of above-described power storage systems and a concentrated control device to control the plurality of power storage systems. Each of the plurality of power storage systems outputs information on charging and discharging restriction on the power storage device to the concentrated control device.

Advantageous Effects of Invention

According to the present disclosure, active power inputted to or outputted from the power converter in the direction in which the grid frequency is away from the frequency reference value is restricted to control an amount of input or an amount of output of active power for compensation for the amount of frequency variation. Therefore, grid frequency control to suppress variation in frequency by suppression of deviation from the frequency reference value can be realized.

DESCRIPTION OF EMBODIMENTS

Figure 1:
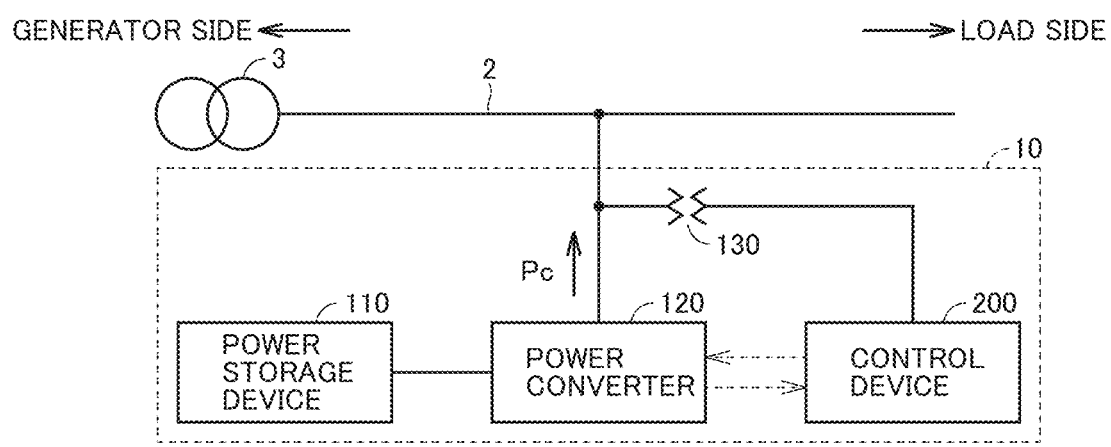
FIG. 1 is a block diagram showing a schematic configuration of a power storage system according to the present embodiment.

An embodiment of the present disclosure will be described in detail below with reference to the drawings. The same or corresponding elements in the drawings below have the same reference characters allotted and description thereof will not be repeated in principle.

First Embodiment

As shown in FIG. 1, a power storage system 10 according to the present embodiment includes a power storage device 110, a power converter 120, a voltage detector 130, and a control device 200. Power storage system 10 is interconnected to a power grid having a power line 2. For example, power line 2 is a power transmission line or a power distribution line. Though FIG. 1 shows power line 2 with a single line for the sake of simplified illustration, power lines corresponding to respective phases of a three-phase alternating-current (AC) system are actually provided. In the example in FIG. 1, on a side of a generator when viewed from a point of connection between power line 2 and power storage system 10, power line 2 is connected to a transformer 3. On a side opposite thereto, power line 2 is connected to a load (not shown).

Power storage device 110 can be implemented by any device in which electric energy can be stored and from which stored electric energy can be emitted. Power storage device 110 is implemented, for example, by a rechargeable battery such as a lithium ion secondary battery, a sodium sulfur battery, a redox flow battery, a lead acid battery, or a nickel metal hydride battery. Alternatively, power storage device 110 can also be implemented by a large-capacity capacitor such as a multi-layer capacitor or a lithium ion capacitor, and can also further be implemented by a combination of a rechargeable battery and a capacitor. Power storage device 110 may be a device where kinetic energy converted from electric energy is stored, such as a flywheel.

Power converter 120 is connected between power line 2 and power storage device 110 and can perform rectification which is conversion of AC into direct current (DC) and inversion which is conversion of DC into AC. More specifically, power converter 120 can perform rectification to convert AC power that flows through power line 2 into DC power and to charge power storage device 110 with this DC power. In contrast, power converter 120 can perform inversion to convert DC power discharged from power storage device 110 into AC power and to output this AC power to power line 2. As a result of such inversion and rectification, power converter 120 interchanges electric power between the power grid (power line 2) and the power storage device.

In the present embodiment, regarding the polarity of active power Pc inputted to and outputted from power converter 120, active power Pc outputted from power converter 120 to power line 2 as a result of inversion is defined as having a positive value (Pc>0), whereas active power Pc inputted from power line 2 to power converter 120 as a result of rectification is defined as having a negative value (Pc<0).

Power converter 120 includes a plurality of semiconductor switching elements (not shown), and it is configured to perform rectification (when relation of Pc<0 is satisfied) or inversion (when relation of Pc>0 is satisfied) as a result of on and off control of the semiconductor switching elements in accordance with a switching control signal from control device 200.

Power converter 120 is representatively a self-commutated converter implemented by a semiconductor switching element with self-turn-off capability. For example, a two-level or three-level modular multilevel converter (MMC) or the like can be employed as the self-commutated converter. Power converter 120 is configured to input and output active power Pc to and from power line 2 by performing an operation in accordance with the switching control signal from control device 200.

Alternatively, power converter 120 may be an externally-commutated converter implemented by a semiconductor switching element without self-turn-off capability, such as a thyristor. A circuit configuration of power converter 120 is not particularly limited so long as it can control active power Pc by rectification and inversion.

Voltage detector 130 detects a voltage at a point of connection between power storage system 10 and power line 2, that is, a point where power storage device 110 is interconnected to power line 2.

Control device 200 calculates a grid frequency based on a voltage detected by voltage detector 130, and generates a switching control signal for power converter 120 such that active power Pc for compensation for an amount of variation in calculated grid frequency is inputted and outputted to and from power line 2. Control device 200 thus controls power converter 120 to thereby compensate for imbalance between demand and supply of electric power which causes variation in grid frequency.

Information on an operating state of power converter 120 is provided from power converter 120 to control device 200.

Figure 2:
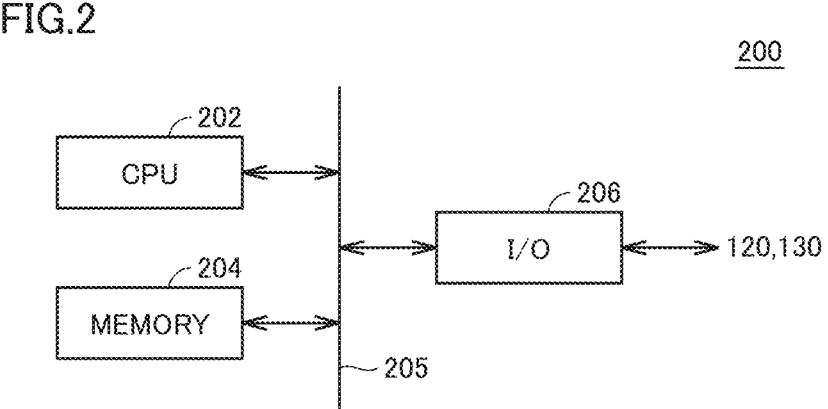
FIG. 2 is a block diagram showing an exemplary hardware configuration of a control device shown in FIG. 1.

FIG. 2 shows an exemplary hardware configuration of control device 200. Control device 200 can representatively be implemented by a microcomputer where a prescribed program is stored in advance.

For example, as shown in FIG. 2, control device 200 is configured on a computer basis to include a central processing unit (CPU) 202, a memory 204, and an input and output (I/O) circuit 206. CPU 202, memory 204, and I/O circuit 206 can provide and receive data to and from one another through a bus 205. A program is stored in advance in a partial area of memory 204, and grid frequency compensation control which will be described later can be carried out by execution of the program by CPU 202. I/O circuit 206 receives input and provides output of a signal and data from and to the outside of control device 200 (for example, power converter 120 and voltage detector 130).

Alternatively, unlike the example in FIG. 2, at least a part of control device 200 can be implemented by such a circuit as a field programmable gate array (FPGA) or an application specific integrated circuit (ASIC). Alternatively, at least a part of control device 200 can also be implemented by an analog circuit. A function of each block implementing each functional block diagram of control device 200 which will be described later can thus be performed by at least one of software processing and hardware processing.

A problem of a power grid will now be described.

When balance between demand and supply of active power is lost, in general, excess or shortfall of active power is compensated for by a characteristic of a rotating machine of a generator. For example, when demand for active power is more than supply, rotary energy of the rotating machine of the generator is converted to active power for supply of electric power, and hence the frequency of the power grid gradually lowers. In this case, in general, a difference between demand and supply of active power is compensated for by control of a governor system of the generator. A time period of ten seconds or longer, however, is often required for response to mechanical input by the generator, and the governor system is limited in active power it supplies. Therefore, compensation for frequency variation with the use of rotary energy of the generator is limited in responsiveness.

Furthermore, when the number of distributed power supplies that utilize renewable energy increases in the power grid, the number of generators is estimated to relatively decrease. When the number of generators in the power grid becomes smaller, rotary energy in the generators as a whole also lowers because of reduction in inertia obtained owing to the rotating machines. Therefore, the grid frequency tends to more abruptly vary. In view of such backgrounds, there is a concern about difficulty in suppression of variation in grid frequency only by control of the governor system of the generator.

A situation that at least one of the generators fails due to a fault is assumed as an example where active power that flows through a power transmission line greatly varies. In such a situation, active power is not supplied to a load from the generator that has failed, and it is expected that demand for active power relatively greatly exceeds supply. Consequently, there is a concern about abrupt lowering in grid frequency with decrease in number of generators in the power grid. When the grid frequency lowers, a distributed power supply such as a photovoltaic power generation system and a wind power generation system is disconnected from the power grid. Supply of active power from the distributed power supply thus also decreases, and further lowering in grid frequency is a concern.

In order to compensate for such frequency variation, a grid frequency should be controlled by interchange of electric power by supply of active power to the power grid (power line 2) or absorption of active power from the power grid (power line 2) as in power storage system 10 shown in FIG. 1.

Figure 3:
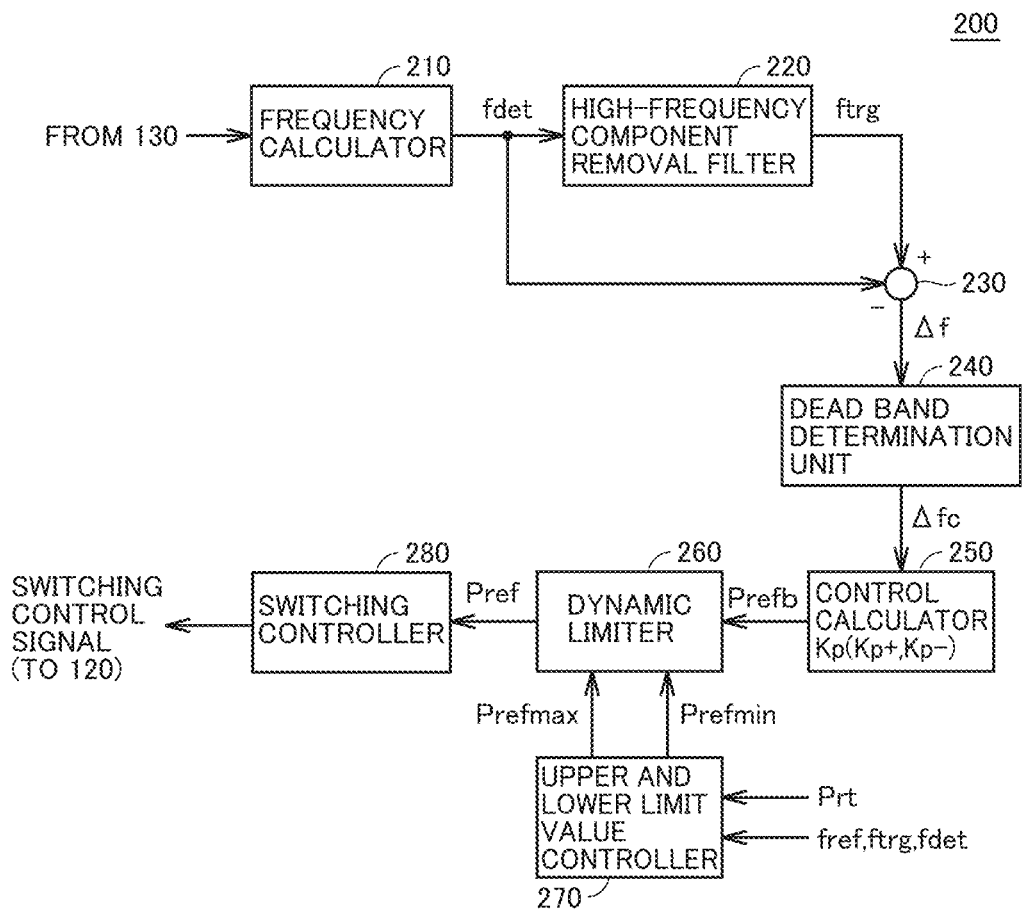
FIG. 3 is a functional block diagram illustrating grid frequency control according to a first embodiment.

FIG. 3 shows a functional block diagram illustrating grid frequency control according to a first embodiment.

Control device 200 includes a frequency calculator 210, a high-frequency component removal filter 220, a frequency variation amount calculator 230, a dead band determination unit 240, a control calculator 250, a dynamic limiter 260, an upper and lower limit value setting unit 270, and a switching controller 280.

Frequency calculator 210 calculates from a waveform of an AC voltage on power line 2 detected by voltage detector 130, a frequency detection value fdet of the grid which represents a frequency of this voltage. Frequency detection value fdet is successively calculated every cycle or every multiple cycles of the voltage waveform.

High-frequency component removal filter 220 outputs a frequency target value ftrg obtained by removal of a high-frequency component from frequency detection value fdet successively calculated by frequency calculator 210. For example, high-frequency component removal filter 220 removes a variation component having a cycle shorter than a cycle of several seconds to several ten seconds. High-frequency component removal filter 220 can representatively be implemented by a low pass filter (LPF) or a moving average filter.

Frequency variation amount calculator 230 calculates an amount of frequency variation $\Delta f$ ($\Delta f=ftrg-fdet$) by subtracting frequency detection value fdet outputted by frequency calculator 210 from frequency target value ftrg outputted by high-frequency component removal filter 220. For example, when frequency detection value fdet is smaller than frequency target value ftrg, the amount of frequency variation may be set to $\Delta f>0$ in order to increase the grid frequency.

Dead band determination unit 240 receives amount of frequency variation $\Delta f$ from frequency variation amount calculator 230, and outputs an amount of frequency variation $\Delta fc$ resulting from dead band processing, which is to be inputted to control calculator 250.

Figure 4:
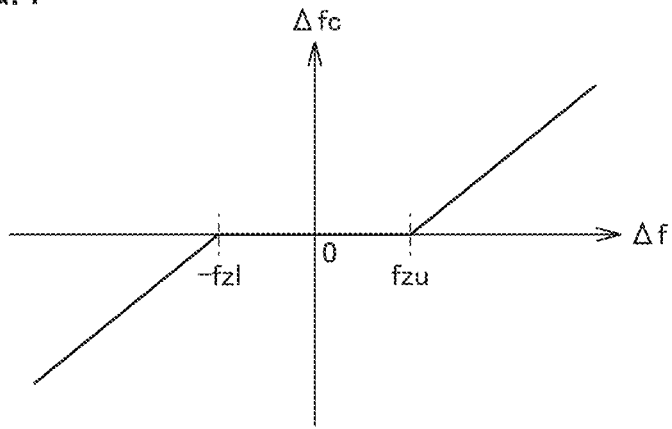
FIG. 4 is a conceptual diagram for illustrating dead band processing performed by a dead band determination unit shown in FIG. 3.

FIG. 4 shows a conceptual diagram for illustrating dead band processing by dead band determination unit 240.

As shown in FIG. 4, dead band determination unit 240 outputs amount of frequency variation $\Delta fc$ resulting from dead band processing based on comparison of a dead band upper limit value fzu (fzu>0) and a dead band lower limit value −fzl (fzl>0) with amount of frequency variation $\Delta f$ outputted from frequency variation amount calculator 230.

Specifically, when relation of $-fzl \leq \Delta f \leq fzu$ is satisfied, $\Delta fc=0$ is set, whereas when relation of $\Delta f>fzu$ is satisfied, $\Delta fc=\Delta f-fzu$ is set, and when relation of $\Delta f<-fzl$ is satisfied, $\Delta fc=\Delta f+fzl$ is set. In other words, fzu corresponds to one embodiment of the "first reference value" and fzl corresponds to one embodiment of the "second reference value." Dead band determination unit 240 does not have to be arranged. In this case, amount of frequency variation $\Delta fc=\Delta f$ is inputted to control calculator 250.

Control calculator 250 generates a power command value Prefb (Prefb=Kp·$\Delta fc$) which serves as a base, by multiplying amount of frequency variation $\Delta fc$ by a gain Kp. Alternatively, a gain Kp+ to be used for the amount of frequency variation ($\Delta fc>0$) to indicate lowering in frequency and a gain Kp- to be used for the amount of frequency variation ($\Delta fc<0$) to indicate increase in frequency can also separately be set as gain Kp. In this case, power command value Prefb is calculated in accordance with expressions (1) and (2) below.

$$Prefb = Kp + \cdot \Delta fc \text{ (where } \Delta fc > 0) \quad (1)$$

$$Prefb = Kp - \cdot \Delta fc \text{ (where } \Delta fc < 0) \quad (2)$$

Power command value Prefb outputted from control calculator 250 is inputted to dynamic limiter 260. Upper and lower limit value setting unit 270 variably sets an active power upper limit value Prefmax (Prefmax≥0) to restrict discharging and an active power lower limit value Prefmin (Prefmin≤0) to restrict charging in accordance with relation of values among frequency detection value fdet (frequency calculator 210), frequency target value ftrg (high-frequency component removal filter 220), and a frequency reference value fref (for example, 50 [Hz] or 60 [Hz]) corresponding to a nominal value of a predetermined grid frequency.

Dynamic limiter 260 outputs an active power command value Pref resulting from limiter processing with the use of active power upper limit value Prefmax and active power lower limit value Prefmin set by upper and lower limit value setting unit 270 for power command value Prefb outputted from control calculator 250.

While relation of Prefb>0 is satisfied, dynamic limiter 260 sets Pref=Prefb when relation of Prefb≤Prefmax is satisfied and sets Pref=Prefmax when relation of Prefb>Prefmax is satisfied.

On the other hand, while relation of Prefb<0 is satisfied, dynamic limiter 260 sets Pref=Prefb when relation of Prefb≥Prefmin is satisfied and sets Pref=Prefmin when relation of Prefb<Prefmin is satisfied.

Switching controller 280 generates a switching control signal for control of on and off of the plurality of semiconductor switching elements included in power converter 120, in accordance with active power command value Pref outputted from dynamic limiter 260. As power converter 120 operates in accordance with the switching control signal, active power Pc in accordance with active power command value Pref is inputted to, or inputted to and outputted from, the power grid (power line 2).

For example, in an example where power converter 120 is a three-phase inverter representing an exemplary self-commutated converter, the switching control signal described above is generated under pulse width modulation (PWM) control in accordance with a voltage command value of each phase on which active power command value Pref is reflected. The voltage command value of each phase is calculated by two-phase/three-phase conversion of an active voltage command value and a reactive voltage command value. The active voltage command value can be calculated based on a difference between an active current command value calculated from active power command value Pref and an active current measurement value calculated from a current detection value of power line 2.

A reactive voltage command value can be calculated based on a difference between a reactive current measurement value calculated from a separately set reactive power command value and a reactive current command value calculated from a current detection value of power line 2. In the present embodiment, for the sake of simplified description, a reactive power command value=0 is set. Alternatively, as is known, the reactive power command value can be set to suppress variation in grid voltage (effective value).

In other words, generally, power converter 120 can control both of reactive power and active power. In the present embodiment, description is given, with control of active power for grid frequency control being focused on.

In the present embodiment, control output in a direction of deviation of the grid frequency (frequency detection value fdet) from frequency reference value fref is prohibited by limiting processing by dynamic limiter 260 on power command value Prefb based on amount of frequency variation Δf.

Figure 5:
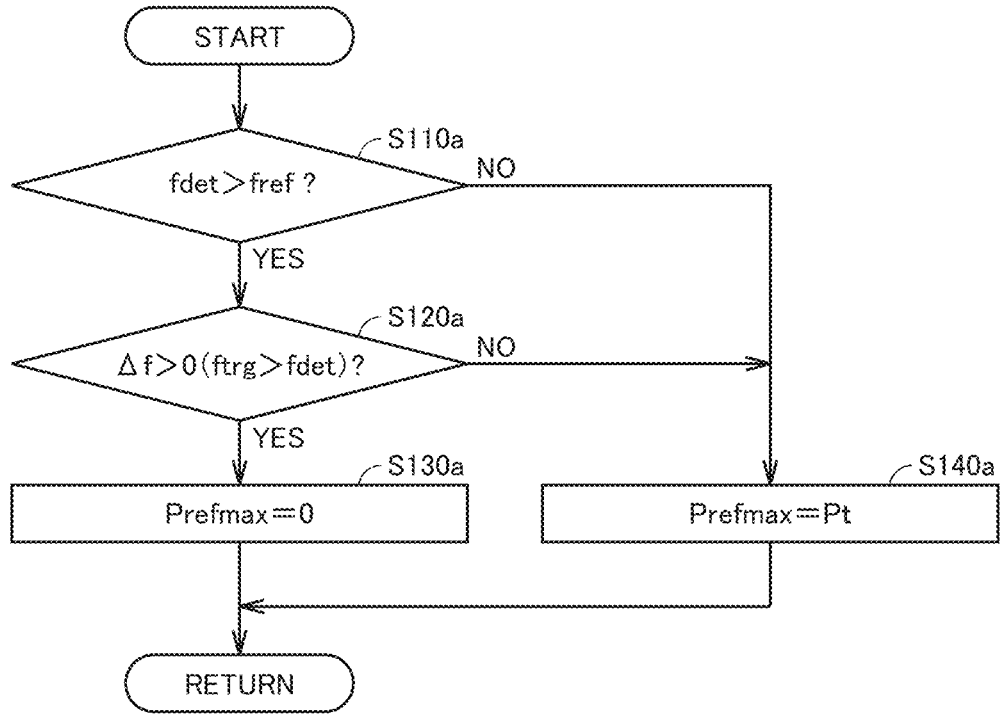
FIG. 5 is a flowchart for illustrating an operation of an upper and lower limit value setting unit shown in FIG. 3.
Figure 5:
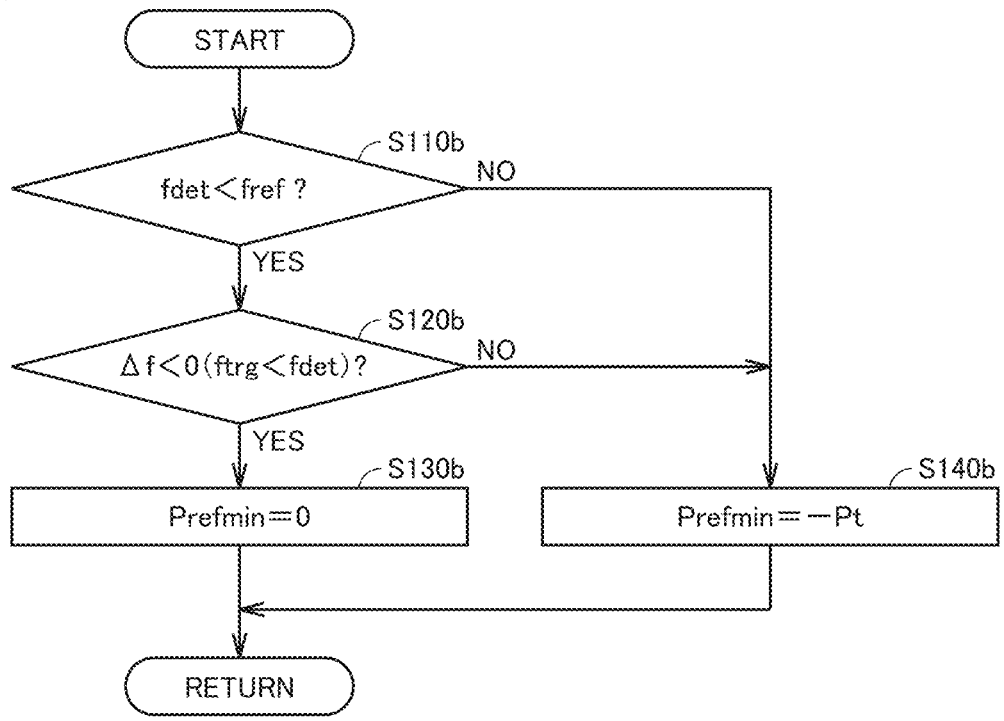

FIG. 5 shows a flowchart for illustrating an operation for setting of active power upper limit value Prefmax and active power lower limit value Prefmin by upper and lower limit value setting unit 270.

As shown in FIG. 5 (a), upper and lower limit value setting unit 270 determines in step (which will simply be denoted as "S" below) 110a whether or not frequency detection value fdet is larger than frequency reference value fref for setting of active power upper limit value Prefmax (Prefmax≥0) and determines in S120a whether or not relation of frequency variation amount Δf>0 is satisfied (that is, whether or not frequency target value ftrg is larger than frequency detection value fdet).

When relation of Δf>0 (ftrg>fdet) is satisfied (determination as YES is made in S120a) while relation of fdet>fref is satisfied (determination as YES is made in SI 10a), in S130a, upper and lower limit value setting unit 270 sets active power upper limit value Prefmax to restrict output of active power for increase in grid frequency. For example, in S130a, in order to prohibit output (discharging) of active power, Prefmax=0 can be set. Alternatively, in order to avoid sudden change in active power Pc, Prefmax can also be set to be closer to 0 at a constant rate with lapse of time when Prefmax was not 0 in a previous control cycle. In other words, setting to fix Prefmax at Prefmax=0 exemplified in S130a corresponds to one manner where restriction on output of active power is most strict.

Otherwise (determination as NO is made in S110a or S120a), in S140a, for normal limiting processing without restriction on output of active power as above, a rated power value Pt (Pt>0) of power converter 120 is used to set Prefmax=Pt.

As shown in FIG. 5 (b), for setting of active power lower limit value Prefmin (Prefmin≤0), in S110b, upper and lower limit value setting unit 270 determines whether or not frequency detection value fdet is smaller than frequency reference value fref, and in S120b, upper and lower limit value setting unit 270 determines whether or not relation of amount of frequency variation Δf<0 is satisfied (that is, whether or not frequency target value ftrg is smaller than frequency detection value fdet).

When relation of Δf<0 (ftrg<fdet) is satisfied (determination as YES is made in S120b) while relation of fdet<fref is satisfied (determination as YES is made in S110b), in S130b, upper and lower limit value setting unit 270 sets active power lower limit value Prefmin to restrict input of active power for lowering in grid frequency. For example, in S130b, in order to prohibit input (charging) of active power, Prefmin=0 can be set. Alternatively, Prefmin can also be set to be closer to 0 at a constant rate with lapse of time. In other words, setting to fix Prefmin at Prefmin=0 exemplified in S130b corresponds to one manner where restriction on input of active7 power is most strict.

Otherwise (determination as NO is made in S110b or S120b), in S140b, for normal limiting processing without restriction on input of active power as above, rated power value Pt (Pt>0) described above is used to set Prefmin=−Pt.

Thus, when relation of values of frequency reference value fref with frequency detection value fdet is different from relation thereof with frequency target value ftrg, that is, when one of relations of fref<fdet<ftrg and ftrg<fdet<fref is satisfied, Prefmax=0 is set for the case of Δf>0 or Prefmin=0 is set for the case of Δf<0.

Referring back to FIG. 3, when Prefmax=0 is set for the case of Δf>0, dynamic limiter 260 sets Pref=0 even when relation of Prefb>0 is satisfied. Thus, when frequency detection value fdet is away from frequency reference value fref by setting of Pref>0 in spite of satisfaction of relation of Δf>0 (ftrg>fdet), Pref=0 can be set.

Similarly, when Prefmin=0 is set for the case of Δf<0, dynamic limiter 260 sets Pref=0 even when relation of Prefb<0 is satisfied. Thus, when frequency detection value fdet is away from frequency reference value fref by setting of Pref<0 in spite of satisfaction of relation of Δf<0 (fdet>ftrg), Pref=0 can be set.

Figure 6:
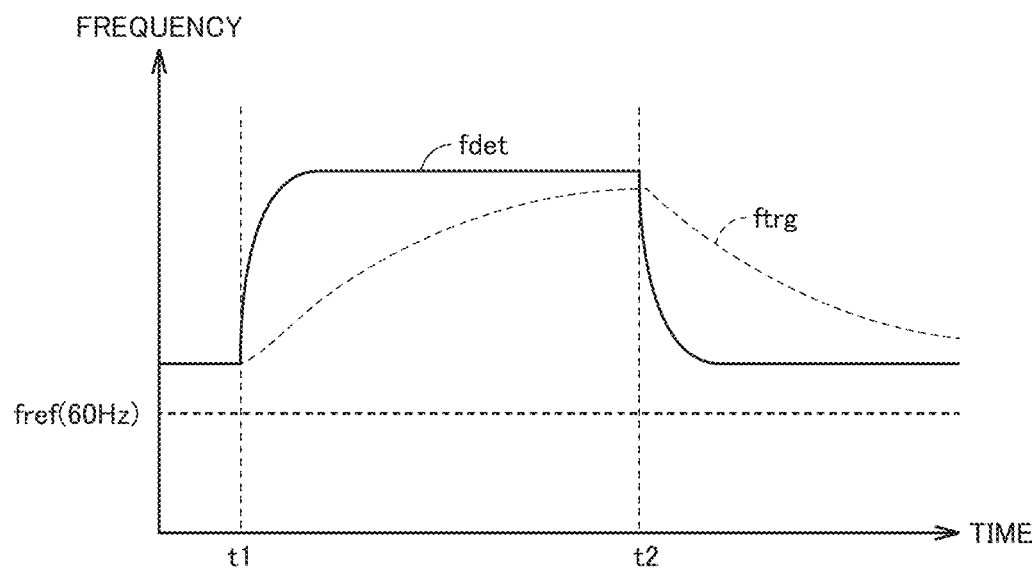
FIG. 6 is a first waveform diagram illustrating an exemplary operation in grid frequency control by the power storage system according to the first embodiment.
Figure 7:
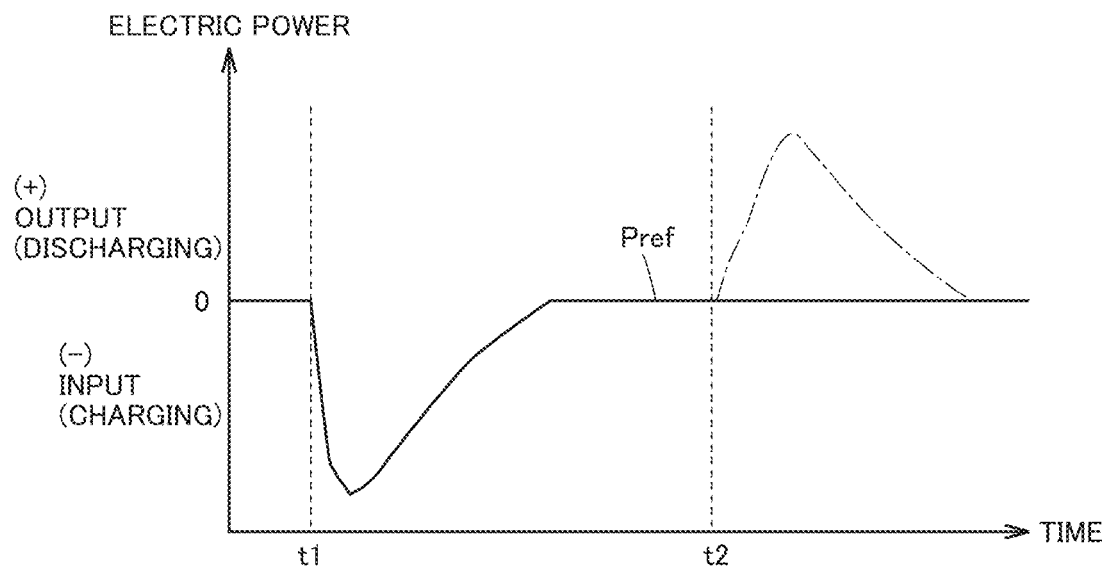
FIG. 7 is a second waveform diagram illustrating an exemplary operation in grid frequency control by the power storage system according to the first embodiment.

FIGS. 6 and 7 show waveform diagrams for illustrating an exemplary operation of the power storage system according to the first embodiment.

FIG. 6 shows exemplary transition of frequency detection value fdet and frequency target value ftrg on the occurrence of frequency variation. FIG. 7 shows an exemplary waveform of active power inputted and outputted between power converter 120 and power line 2 when grid frequency control by the power storage system is applied to frequency variation shown in FIG. 6.

As shown in FIG. 6, from a stable state where relation of fdet>fref is satisfied, at time t1, frequency detection value fdet increases due to abrupt disturbance (for example, lowering in load power). In order to address such frequency variation, normally in the power grid, the governor system of the generator operates to stabilize the grid frequency. Furthermore, at time t2, active power supplied to the power grid decreases due to a failure or the like of the generator, which lowers frequency detection value fdet. Thereafter, the grid frequency is again stabilized owing to the governor system of the generator.

Since responsiveness of the governor system is not so high, in the present embodiment, grid frequency control by power storage system 10 is applied to frequency variation shown in FIG. 6 so as to quickly address frequency variation. As shown in FIG. 6, frequency target value ftrg after passage through high-frequency component removal filter 220 calculated in FIG. 3 gradually increases with change in frequency detection value fdet during a period from time t1 to time t2, and starts to lower at time t2.

According to grid frequency control according to the first embodiment, at time t1 or later, relation of Δf<0 is satisfied because relation of fdet>ftrg is satisfied. Therefore, in FIG. 3, Prefb<0 is set. Furthermore, since relation of fdet>fref is also satisfied, relation of values of frequency reference value fref with frequency detection value fdet is the same as relation of values of frequency target value ftrg therewith. Therefore, dynamic limiter 260 does not prohibit charging (Pref=0) and active power command value Pref is set to a negative value (Pref<0).

Thus, as shown in FIG. 7, at time t1 or later, active power command value Pref is set in a negative direction, and power converter 120 of power storage system 10 operates to charge power storage device 110. In response to decrease in |Δf| with increase in frequency target value ftrg with lapse of time, |Pref| and |Pc| in a charging direction also decrease. Consequently, power storage device 10 can operate to lower the grid frequency by output of energy from power line 2 to power storage system 10.

As frequency detection value fdet starts to decrease at time t2 as described above, frequency target value ftrg gently lowers. Therefore, at time t2 or later, relation of ftrg>fdet is satisfied. Since relation of Δf>0 is accordingly satisfied, Prefb>0 is set in FIG. 3.

FIG. 7 shows with a chain dotted line as a comparative example, a control operation at the time when active power command value Pref is set in proportion to amount of frequency variation Δf (Δf=ftrg−fdet), without arrangement of dynamic limiter 260 and upper and lower limit value setting unit 270 in the first embodiment (FIG. 3).

In the comparative example, at time t2 or later, in spite of frequency detection value fdet being larger than frequency reference value fref, active power command value Pref is set in a positive direction and power converter 120 operates such that power storage device 110 discharges. Such an operation of power converter 120 functions in a direction of increase in grid frequency. Therefore, application of grid frequency control according to the comparative example to frequency variation exemplified in FIG. 6 leads to a concern that frequency detection value fdet again increases at time t2 or later and power storage system 10 operates to set frequency detection value fdet away from frequency reference value fref.

In contrast, under grid frequency control according to the first embodiment, in a scene where relation of ftrg>fdet (Δf>0) is satisfied at time t2 or later, relation of fdet>fref is satisfied. Therefore, as described with reference to FIG. 5 (a), Prefmax=0 is set, so that active power command value Pref=0 can be set for the case of Pref>0 (Δf>0). Thus, as shown with a solid line in FIG. 7, relation of Pc=0 is maintained also at time t2 or later. Thus, also at time t2 or later, an operation of the power storage system in the direction in which frequency detection value fdet is away from frequency reference value fref can be avoided.

According to PTL 1 (Japanese Patent No. 6232899) described above, control for compensation for frequency variation equivalent to amount of frequency variation Δf in the present embodiment can be realized with the use of an output from the high pass filter. In PTL 1, however, as in the example in FIG. 6, when the grid frequency abruptly becomes lower within the range not smaller than the frequency reference value from the state where it is higher than the frequency reference value, there is a concern that frequency control functions to deviate the grid frequency (frequency detection value fdet) from frequency reference value fref as shown with the chain dotted line in FIG. 7.

In contrast, according to the power storage system in the first embodiment, in consideration of relation of values of frequency target value ftrg and frequency reference value fref with frequency detection value fdet, even input and output of active power in a direction to bring frequency detection value fdet closer to frequency target value ftrg is restricted when it is applied in the direction in which frequency detection value fdet is away from frequency reference value fref. Consequently, grid frequency control to suppress frequency variation by suppression of deviation from the frequency reference value can be realized.

Second Embodiment

Figure 8:
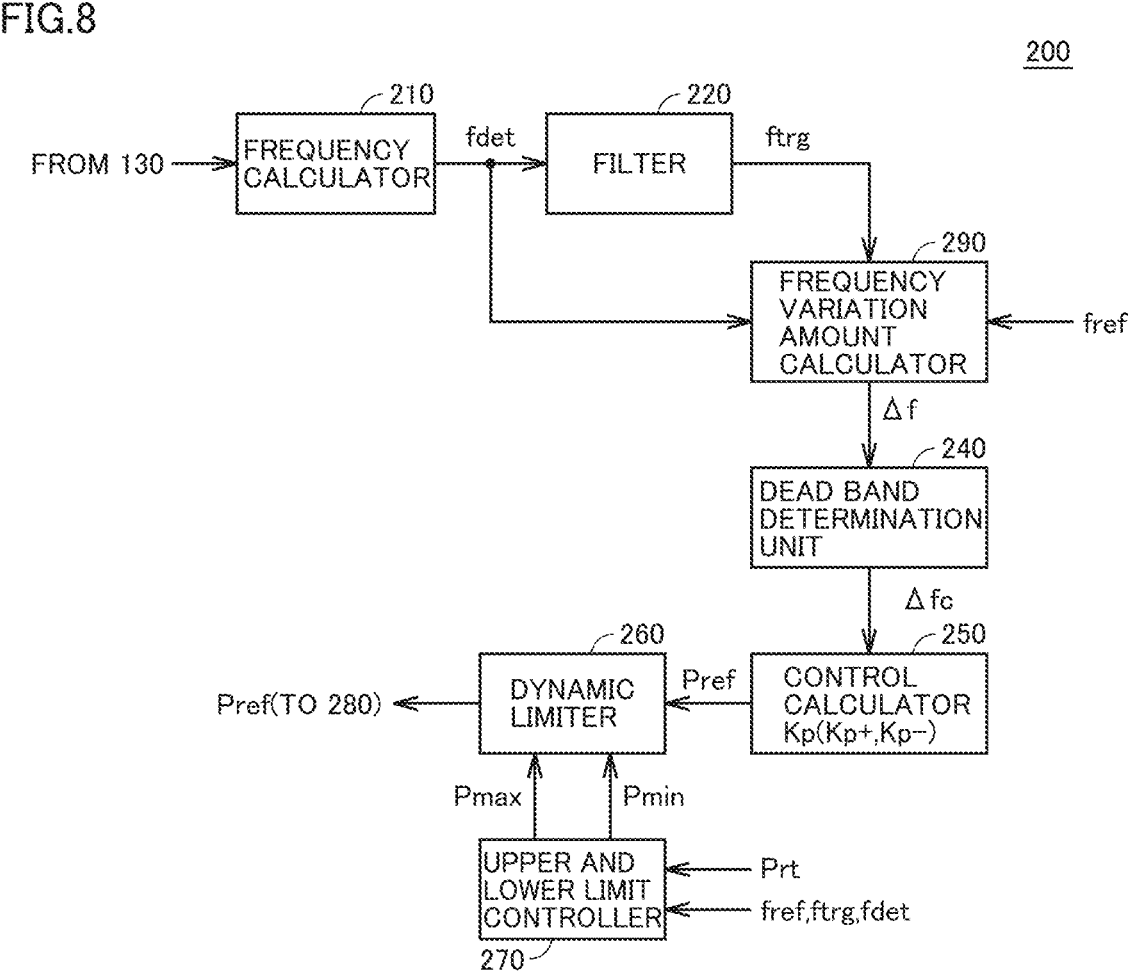
FIG. 8 is a functional block diagram illustrating grid frequency control according to a second embodiment.

In a power storage system according to a second embodiment, grid frequency control in the system configuration (FIG. 1) as in the first embodiment is changed to contents in a functional block diagram shown in FIG. 8.

As shown in FIG. 8, in the power storage system according to the second embodiment, control device 200 includes frequency calculator 210, high-frequency component removal filter 220, a frequency variation amount calculator 290, dead band determination unit 240, control calculator 250, dynamic limiter 260, upper and lower limit value setting unit 270, and switching controller 280 shown in FIG. 3. In other words, the second embodiment is different from the configuration (FIG. 3) in the first embodiment in arrangement of frequency variation amount calculator 290 instead of frequency variation amount calculator 230.

Frequency variation amount calculator 290 further receives input of frequency reference value fref in addition to frequency detection value fdet and frequency target value ftrg. Frequency variation amount calculator 290 calculates frequency variation amount Δf by performing control processing shown in FIG. 9. Dead band determination unit 240 again does not have to be provided in the second embodiment. In this case, amount of frequency variation Δf outputted from frequency variation amount calculator 290 is set as it is as Δfc=Δf, and inputted to control calculator 250.

Figure 9:
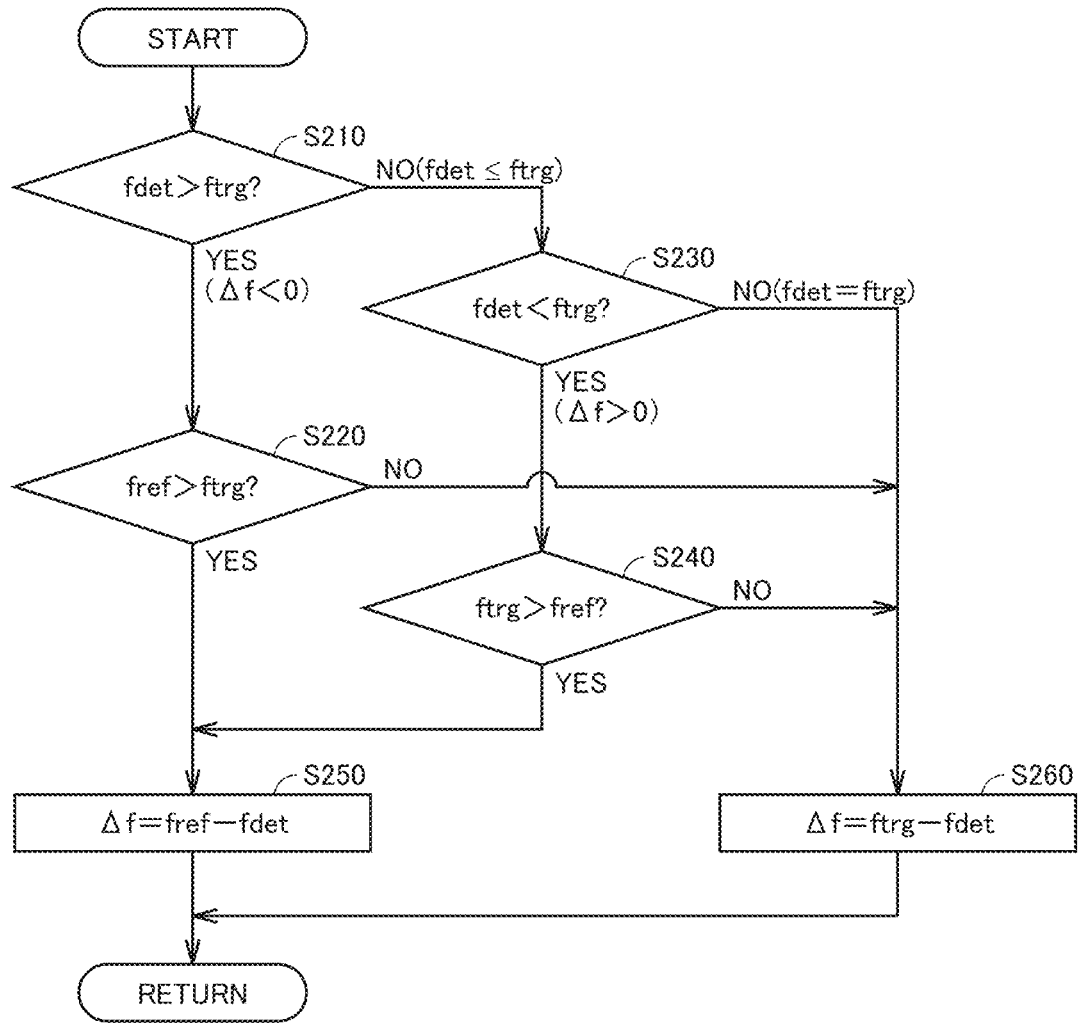
FIG. 9 is a flowchart for illustrating principles of calculation of a frequency difference by a frequency variation amount calculator shown in FIG. 8.

As shown in FIG. 9, in S210, frequency variation amount calculator 290 compares value of frequency detection value fdet and value of frequency target value ftrg with each other. When relation of fdet>ftrg is satisfied (determination as YES is made in S210), in S220, whether or not relation of fref>ftrg is satisfied is determined.

When determination as NO is made in S210 (fdet ftrg), in S230, frequency variation amount calculator 290 determines whether or not relation of fdet<ftrg is satisfied, and when relation of fdet<ftrg is satisfied (determination as YES is made in S230), in S240, frequency variation amount calculator 290 further determines whether or not relation of ftrg>fref is satisfied.

When relation of det>ftrg and relation of fref>ftrg are satisfied (determination as YES is made in S220) or when relation of fdet<ftrg and relation of ftrg>fref are satisfied (determination as YES is made in S240), in S250, frequency variation amount calculator 290 calculates amount of frequency variation Δf (Δf=fref-fdet) by using frequency reference value fref instead of frequency target value ftrg.

It is understood that there is a concern that, when active power command value Pref is set in accordance with Δf (Pref<0) while relation of fref>ftrg is satisfied in a state of fdet>ftrg, that is, Δf<0, active power Pc (Pc<0) in accordance with the active power command value functions to decrease frequency detection value fdet in the direction away from frequency reference value fref. Specifically, in a case where frequency reference value fref is located between frequency target value ftrg and frequency detection value fdet with relation of ftrg<fref<fdet being satisfied, there is a concern that control to vary frequency detection value fdet toward frequency target value ftrg leads to such excessive control of active power that frequency detection value fdet decreases beyond frequency reference value fref in the direction away from frequency reference value fref.

Similarly, there is a concern that, when active power command value Pref is set in accordance with Δf (Pref>0) while relation of ftrg>fref is satisfied in a state of fdet<ftrg, that is, Δf>0, active power Pc (Pc>0) in accordance with the active power command value functions to increase frequency detection value fdet in the direction away from frequency reference value fref. Specifically, in a case where frequency reference value fref is located between frequency target value ftrg and frequency detection value fdet (fdet<fref<ftrg), as in the case above, there is a concern about such excessive control of active power that frequency detection value fdet increases beyond frequency reference value fref in the direction away from frequency reference value fref.

Therefore, in the two cases (determination as YES is made in S220 or S240) above, amount of frequency variation Δf is calculated based on frequency reference value fref so as to suppress input and output of active power applied to vary frequency detection value fdet in the direction away from frequency reference value fref.

In contrast, when relation of fdet>ftrg (Δf<0) and relation of fref≤ftrg are satisfied (determination as NO is made in S220) or when relation of fdet<ftrg (Δf>0) and relation of ftrg s: fref are satisfied (determination as NO is made in S240), in S260, frequency variation amount calculator 290 calculates amount of frequency variation Δf (Δf=ftrg-fdet) based on frequency target value ftrg as in the first embodiment.

In a frequency stable state where relation of fdet=ftrg is satisfied, determination as NO is made in both of S210 and S230, so that Δf=0 is set in S260.

In grid frequency control according to the first embodiment, when relation of values of frequency detection value fdet with frequency target value ftrg is the same as relation of values thereof with frequency reference value fref, active power Pc in proportion to Δf=ftrg-fdet is inputted or outputted. In the two cases described above, however, there is a concern that setting of active power command value Pref (Prefb) in accordance with (ftrg-fdet) may lead to excessive input and output of active power or reverse action and control of the grid frequency (frequency detection value fdet) away from frequency reference value fref.

Therefore, in the second embodiment, even in the case where output of active power (discharging of power storage device 110) for the case of ftrg>fdet or input of active power (charging of power storage device 110) for the case of ftrg<fdet is not restricted in the first embodiment, in consideration of relation of values between frequency reference value fref and frequency target value ftrg, amount of frequency variation Δf can be calculated to prevent such input and output of active power as varying frequency detection value fdet in the direction away from frequency reference value fref.

Figure 10:
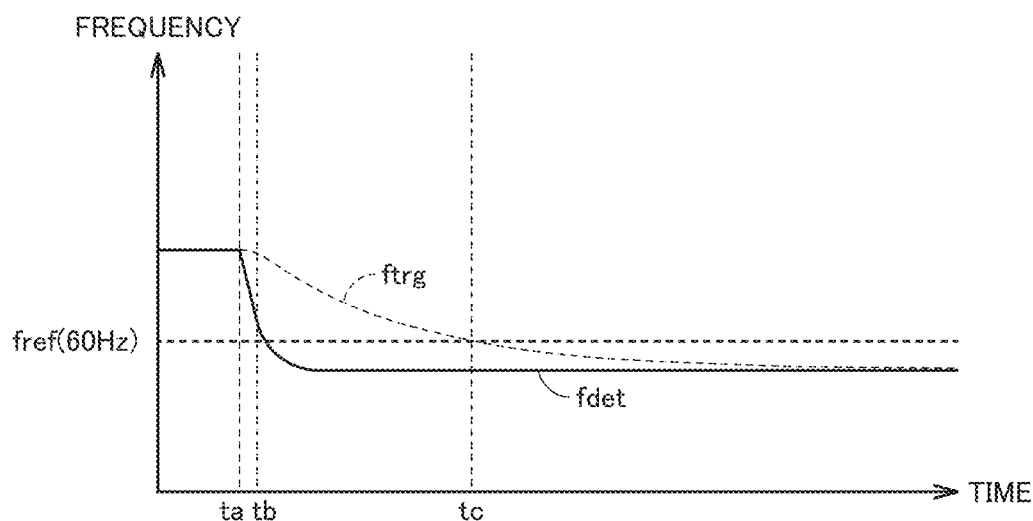
FIG. 10 is a first waveform diagram illustrating an exemplary operation in grid frequency control by the power storage system according to the second embodiment.
Figure 11:
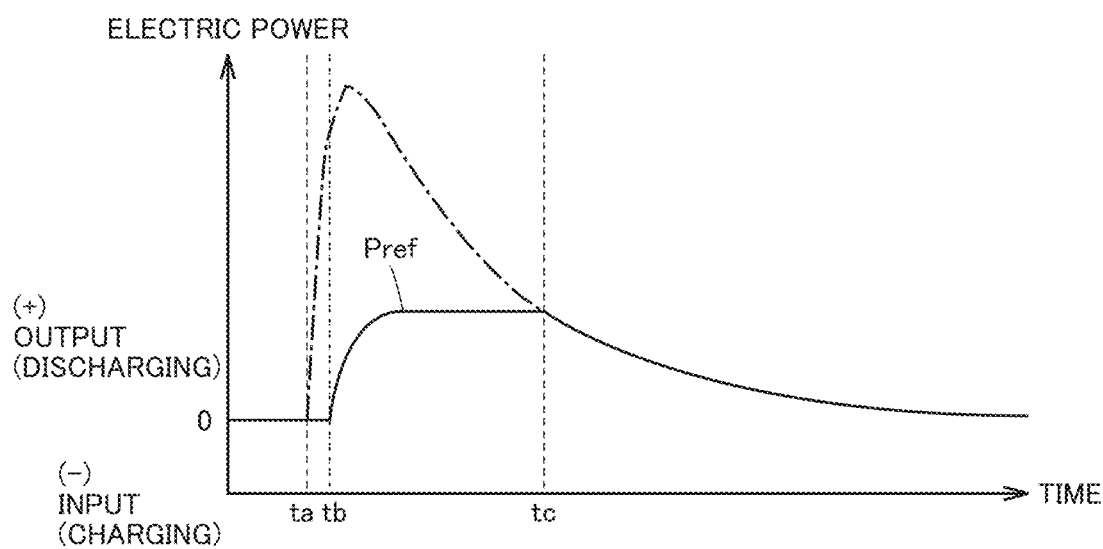
FIG. 11 is a second waveform diagram illustrating an exemplary operation in grid frequency control by the power storage system according to the second embodiment.
Figure 12:
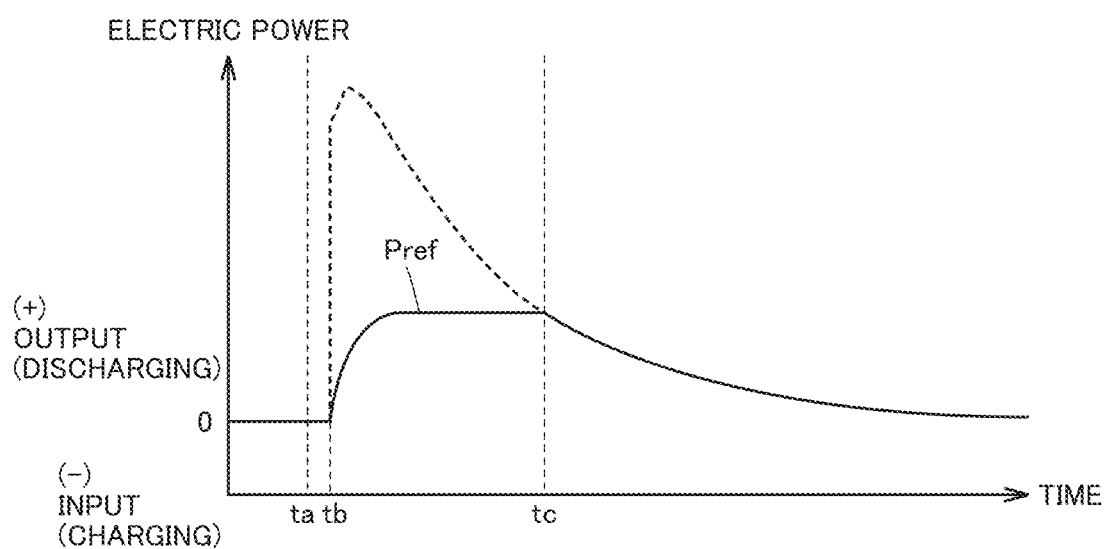
FIG. 12 is a third waveform diagram illustrating an exemplary operation in grid frequency control by the power storage system according to the second embodiment.

FIGS. 10 to 12 show waveform diagrams for illustrating an exemplary operation of the power storage system according to the second embodiment.

FIG. 10 shows another example of transition of frequency detection value fdet and frequency target value ftrg. Unlike FIG. 6, in FIG. 10, from the stable state where relation of fdet>fref is satisfied, at time ta, frequency detection value fdet lowers due to abrupt disturbance (for example, increase in load power). Frequency detection value fdet decreases to frequency reference value fref at time tb, and thereafter makes transition to be stabilized in a region lower than frequency reference value fref as a result of operations of the governor of the generator described above. In accordance with such transition of frequency detection value fdet, frequency target value ftrg outputted from high-frequency component removal filter 220 also gradually decreases, and at time tc or later, frequency target value ftrg becomes smaller than frequency reference value fref. Consequently, during a period from time tb to time tc, the above-described state that frequency reference value fref is located between frequency target value ftrg and frequency detection value fdet is established.

FIGS. 11 and 12 show exemplary waveforms of active power inputted and outputted between power converter 120 and power line 2 when grid frequency control by the power storage system is applied to frequency variation shown in FIG. 10. FIGS. 11 and 12 show with a solid line, setting of active power command value Pref according to the second embodiment (FIG. 8).

FIG. 11 further shows with a chain dotted line, a waveform of active power command value Pref according to the comparative example as in FIG. 7. Specifically, the chain dotted line shows transition of active power command value Pref set in proportion to amount of frequency variation $\Delta f$ ($\Delta f$=ftrg-fdet) based on frequency target value ftrg, without provision of dynamic limiter 260 and upper and lower limit value setting unit 270. FIG. 12 further shows with a dotted line, transition of active power command value Pref set according to the first embodiment (FIG. 3).

As shown in FIGS. 11 and 12, in grid frequency control according to the second embodiment, during a period from time ta to time tb, relation of values of frequency detection value fdet with frequency target value ftrg is different from relation thereof with frequency reference value fref. Therefore, dynamic limiter 260 and upper and lower limit value setting unit 270 as in the first embodiment restrict output (discharging of power storage device 110) of active power for the case of fdet<ftrg. During the period from time ta to time tb, Prefmax=0 (Pref=0) is set, so that Pc is controlled to Pc=0.

Furthermore, in grid frequency control according to the second embodiment, during a period from time tb to time tc, relation of ftrg>fdet ($\Delta f$>0) is satisfied whereas relation of ftrg>fref is satisfied. Therefore, determination as YES is made in S240 in FIG. 9, and active power command value Pref is controlled to be in proportion to (fref−fdet). Active power command value Pref (Pref>0) being set to an excessively large value in accordance with (ftrg−fdet) can thus be avoided.

At time tc or later, frequency target value ftrg becomes smaller than frequency reference value fref Therefore, relation of ftrg s: fref is satisfied for the case of $\Delta f$>0. Determination as NO is hence made in S240 in FIG. 9, and active power Pc inputted and outputted between power storage system 10 and power line 2 is controlled in accordance with $\Delta f$=ftrg-fdet.

In contrast, in grid frequency control according to the comparative example shown in FIG. 11, at time ta or later when frequency detection value fdet starts to decrease, active power command value Pref is set in proportion to amount of frequency variation $\Delta f$ ($\Delta f$=ftrg-fdet) based on frequency target value ftrg. Thus, there is a concern that active power is controlled in accordance with amount of frequency variation $\Delta f$ based on frequency target value ftrg larger than frequency reference value fref and power storage system 10 operates to increase the grid frequency (frequency detection value fdet) in the direction away from frequency reference value fref.

In grid frequency control according to the first embodiment shown with the dotted line in FIG. 12, during the period from time ta to time tb, as in the second embodiment, output of active power (discharging of power storage device 110) can be restricted to control Pc to Pc=0 under relation of frequency target value ftrg>frequency detection value fdet>frequency reference value fref. During the period from time tb to time tc when frequency reference value fref is located between frequency target value ftrg and frequency detection value fdet, however, as in the comparative example in FIG. 11, active power command value Pref is controlled in accordance with amount of frequency variation $\Delta f$ based on frequency target value ftrg larger than frequency reference value fref Consequently, there is a concern about output of excessive active power by power storage system 10 to increase the grid frequency (frequency detection value fdet) in the direction away from frequency reference value fref.

In contrast, in grid frequency control according to the second embodiment, amount of frequency variation $\Delta f$ based on frequency target value ftrg and amount of frequency variation $\Delta f$ based on frequency reference value fref are selectively used to thereby prevent control of active power Pc to set the grid frequency (frequency detection value fdet) away from frequency reference value fref. Consequently, grid frequency control to suppress frequency variation can be realized, with an effect of suppression of deviation from the frequency reference value being further enhanced.

Third Embodiment

A grid control system for concentrated control of the power storage systems according to the first and second embodiments will be described in a third embodiment.

Figure 13:
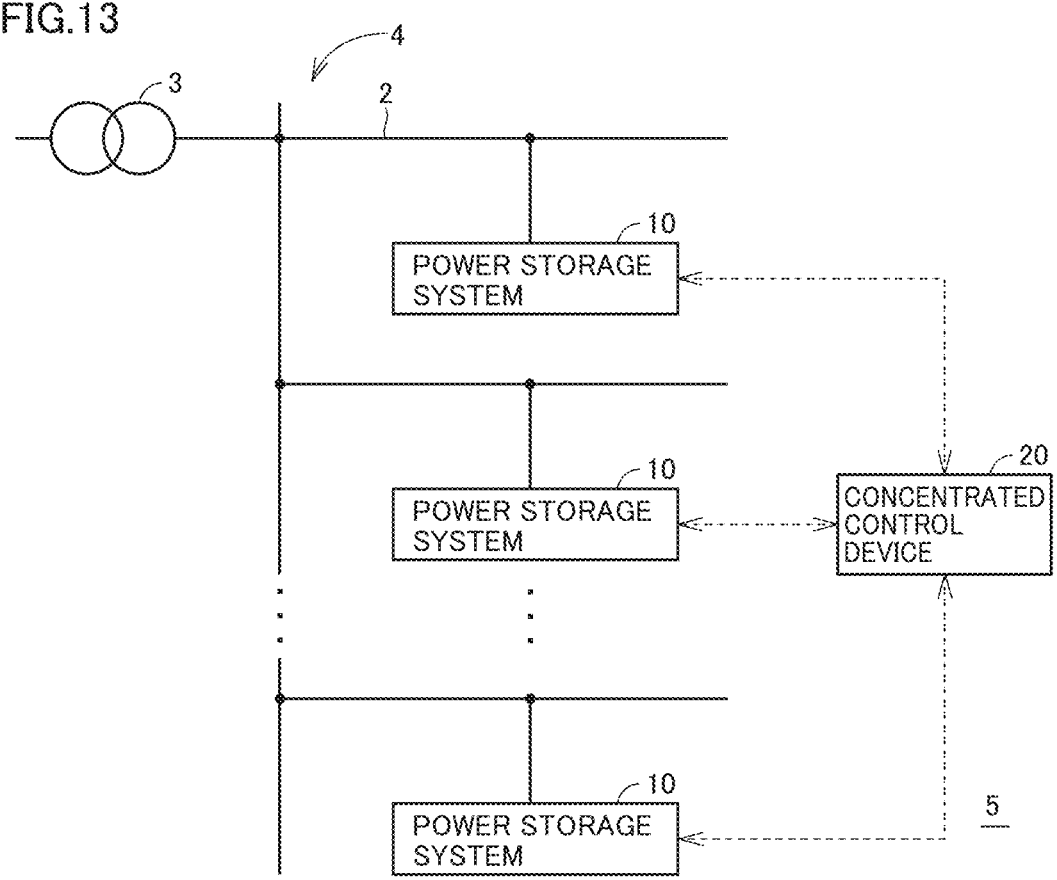
FIG. 13 is a block diagram showing a configuration of a grid control system according to a third embodiment.

As shown in FIG. 13, a grid control system 5 according to the third embodiment includes a plurality of power storage systems 10 connected to a power transmission network 4 of the power grid composed of a plurality of power lines 2 and a concentrated control device 20. Power storage device 10 can carry out the grid frequency control described in the first or second embodiment.

Concentrated control device 20 can also be configured on a computer basis, as in the exemplary hardware configuration of the control device described with reference to FIG. 2. Alternatively, at least one of functions of concentrated control device 20 can also be performed by an ASIC, an FPGA, an analog circuit, or the like.

Concentrated control device 20 is configured to provide and receive information to and from the plurality of power storage systems 10 periodically through wired communication or wireless communication. For example, actual values of input and output of active power and reactive power of power converter 120 as well as a state of charge (SOC), a full charge capacity Qf1, and the like of power storage device 110 are transmitted periodically from each power storage system 10 to concentrated control device 20.

Various commands such as a charging permission command, a charging prohibition command, a discharging permission command, a discharging prohibition command, and the like can be transmitted from concentrated control device 20 to each power storage systems 10. Alternatively, each power storage system 10 may determine whether or not charging can be performed and whether or not discharging can be performed based on a charged state of power storage device 110, and information indicating a result of determination may be transmitted from each power storage system 10 to concentrated control device 20.

According to grid control system 5, each of the plurality of power storage systems 10 is used to secure active power inputted and outputted to and from the power grid for frequency compensation, and then the grid frequency control described in the first and second embodiments can be carried out. Compensation capability in the grid frequency control described in the first and second embodiments can thus be enhanced. Furthermore, by arrangement of concentrated control device 20, charging and discharging restriction on each power storage device 110 in each power storage system 10 can be reflected to improve ability of control by the plurality of power storage systems 10.

Figure 14:
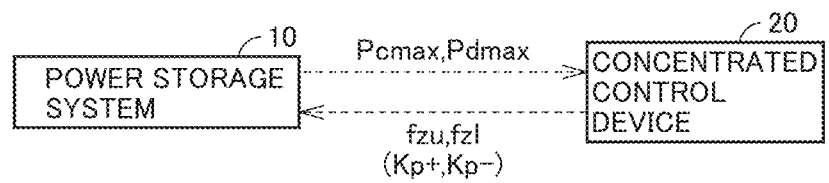
FIG. 14 is a block diagram illustrating exemplary information provided and received between a concentrated control device and each power storage system shown in FIG. 13.

As shown in FIG. 14, in the grid control system according to the third embodiment, information transmitted from each power storage system 10 to concentrated control device 20 includes information on charging and discharging restriction on power storage device 110. For example, the information includes a discharging power upper limit value Pdmax (Pdmax≥0) that can be outputted to power transmission network 4 (power line 2) by power storage device 10 and a charging power upper limit value Pcmax (Pcmax≥0) that can be inputted from power transmission network 4 (power line 2) to power storage device 10.

For example, in power storage system 10 where the SOC of power storage device 110 is close to 100 (%), in order to prevent an overcharged state, Pcmax=0 can be set to restrict charging of power storage device 110. In contrast, in power storage system 10 where the SOC of power storage device 110 has lowered, in order to prevent an overdischarged state, Pdmax=0 can be set to restrict discharging of power storage device 110. In power storage system 10 that has failed or is being inspected, neither of charging and discharging of power storage device 110 can be performed, and hence Pcmax=Pdmax=0 is set.

Alternatively, discharging power upper limit value Pdmax and charging power upper limit value Pcmax of each power storage system 10 can also be set by concentrated control device 20 based on information (SOC, Qf1, or the like) transmitted from each power storage system 10.

As shown in FIG. 14, in the grid control system according to the third embodiment, information transmitted from concentrated control device 20 to each power storage system 10 includes a control parameter value used for the grid frequency control according to the first or second embodiment. The control parameter value includes at least one of a dead band upper limit value fzu (fzu>0) and a dead band lower limit value −fzl (fzl>0) to be used by dead band determination unit 240 and gains Kp+ and Kp− (Kp+>0, Kp−>0) to be used by control calculator 250.

Concentrated control device 20 can find a discharging power upper limit value ΣPdmax and a charging power upper limit value ΣPcmax for power transmission network 4 (that is, the power grid) of grid control system 5 (the plurality of power storage systems 10 as a whole) by summing discharging power upper limit values Pdmax and charging power upper limit values Pcmax of power storage systems 10.

When discharging is restricted in at least one of the plurality of power storage systems 10 that constitute grid control system 5 and discharging power upper limit value Pdmax of that power storage system becomes smaller than a rated value, active power that can be supplied from grid control system 5 (the plurality of power storage systems 10 as a whole) to power transmission network 4 decreases. Therefore, there is a concern about decrease also of active power outputted from grid control system 5 to the power grid in response to abrupt lowering in grid frequency and resultant difficulty in prompt suppression of lowering in grid frequency.

Figure 15:
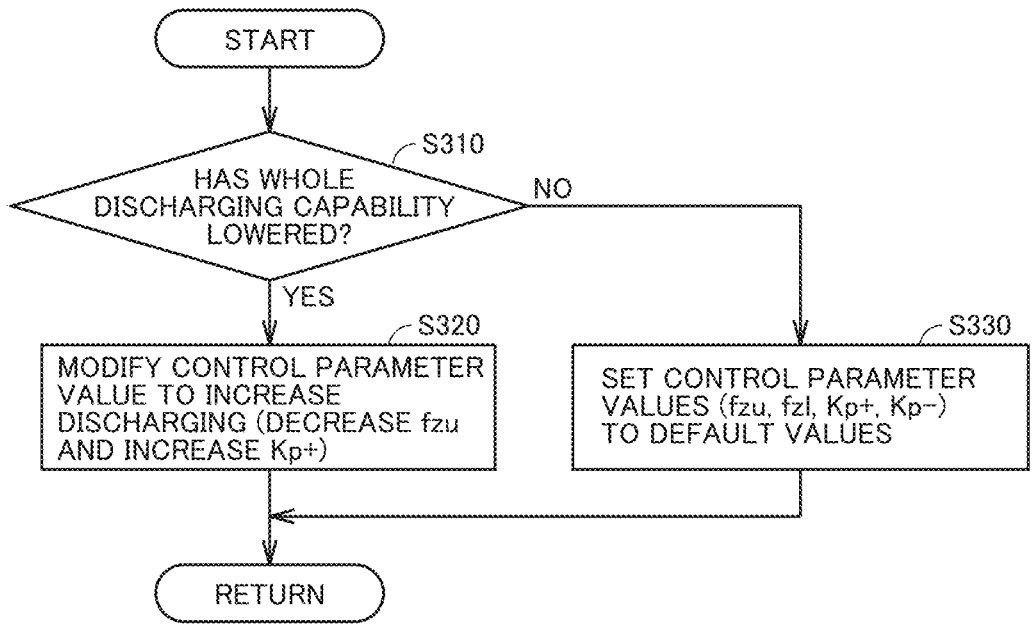
FIG. 15 is a first flowchart illustrating an operation of the concentrated control device shown in FIG. 13.

Therefore, in grid control system 5 according to the third embodiment, in order to address occurrence of restriction of discharging in power storage system 10, a control parameter value of each power storage system 10 is variably controlled in accordance with a flowchart shown in FIG. 15.

As shown in FIG. 15, in S310, concentrated control device 20 determines whether or not discharging capability of grid control system 5 (the plurality of power storage systems 10 as a whole) has lowered. For example, in S310, discharging power upper limit values Pdmax of power storage systems 10 are summed and whether or not a total value (an absolute value) of active power that can be outputted from grid control system 5 (the plurality of power storage systems 10 as a whole) to the power grid has become smaller than a rated value (an absolute value) is determined. Alternatively, determination can also be made in a simplified manner by summing the number of power storage systems 10 where discharging is restricted.

When discharging capability has not lowered (determination as NO is made in S310), in S330, the control parameter values such as dead band upper limit value fzu (fzu>0) and dead band lower limit value −fzl (fzl>0) and gains Kp+ and Kp− are maintained at default values.

In contrast, when discharging capability has lowered (determination as YES is made in S310), in S320, concentrated control device 20 modifies the control parameter value to increase discharging. Specifically, at least one of modification to decrease fzu (a first value) (modification to bring dead band upper limit value fzu closer to 0) so as to narrow a dead band applied to a positive amount of frequency variation Δf and correction to increase gain Kp+ is performed.

As a result of such adjustment, active power can promptly be supplied from each power storage system 10 to the power grid on the occurrence of variation in grid frequency in a direction of lowering where the positive amount of frequency variation (Δf>0) is produced in spite of restriction of output of active power from at least one of power storage systems 10.

An amount of modification of the control parameter value at this time, that is, an amount of decrease in fzu and an amount of increase in Kp+, can also variably be set depending on an amount of lowering in discharging capability. For example, as an amount of decrease in active power upper limit value ΣPdmax relative to the rated value of active power that can be outputted from grid control system 5 (the plurality of power storage systems 10 as a whole) to the power grid is larger or as the number of power storage systems 10 where discharging is restricted is larger, the amount of modification can be larger.

Similarly, when charging is restricted in at least one of the plurality of power storage systems 10 that constitute grid control system 5 and the absolute value of charging power upper limit value Pcmax (Pcmax≥0) of the power storage system becomes smaller than the rated value, active power that can be absorbed by grid control system 5 decreases. Therefore, there is a concern about decrease also of active power inputted to grid control system 5 from power transmission network 4 (power grid) in response to abrupt increase in grid frequency and resultant difficulty in prompt suppression of increase in grid frequency.

Figure 16:
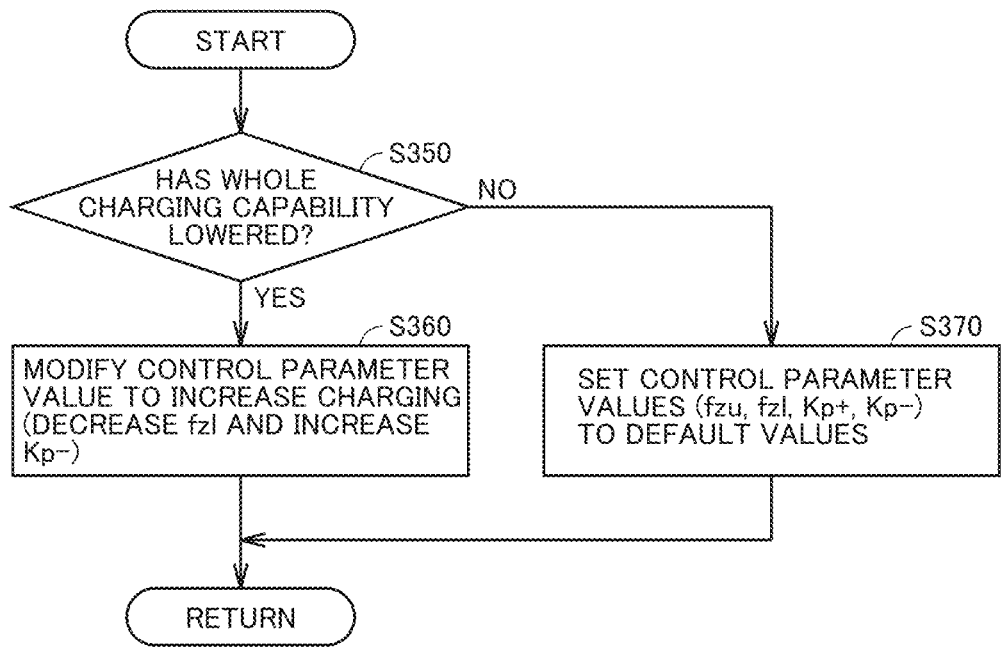
FIG. 16 is a second flowchart illustrating an operation of the concentrated control device shown in FIG. 13.

Therefore, in grid control system 5 according to the third embodiment, in order to address occurrence of restriction of charging in power storage system 10, the control parameter value of each power storage system 10 is variably controlled in accordance with a flowchart shown in FIG. 16.

As shown in FIG. 16, in S350, concentrated control device 20 determines whether or not charging capability of grid control system 5 (the plurality of power storage systems 10 as a whole) has lowered. For example, in S350, charging power upper limit values Pcmax of power storage systems 10 are summed and whether or not a total value (an absolute value) of active power that can be inputted to grid control system 5 (the plurality of power storage systems 10 as a whole) has become smaller than a rated value is determined. Alternatively, determination can also be made in a simplified manner by summing the number of power storage systems 10 where charging is restricted.

When charging capability has not lowered (determination as NO is made in S350), in S370, the control parameter values such as dead band upper limit value fzu (fzu>0) and dead band lower limit value fzl (fzl>0) and gains Kp+ and Kp− are maintained at default values.

In contrast, when charging capability has lowered (determination as YES is made in S350), in S360, concentrated control device 20 modifies the control parameter value to increase charging. Specifically, at least one of modification to decrease the value of fzl (a second reference value) (modification to bring dead band lower limit value −fzl closer to 0) so as to narrow a dead band applied to a negative amount of frequency variation Δf and correction to increase gain Kp− is performed.

As a result of such adjustment, active power can promptly be absorbed by each power storage system 10 on the occurrence of variation in grid frequency in a direction of increase where the negative amount of frequency variation (Δf<0) is produced in spite of restriction of input of active power to at least one of power storage systems 10.

An amount of modification of the control parameter value at this time, that is, an amount of decrease in fzl and an amount of increase in gain Kp−, can also variably be set depending on an amount of lowering in charging capability. For example, as an amount of decrease in charging power upper limit value ΣPcmax relative to the rated value of active power (absolute value) that can be inputted from the power grid to grid control system 5 is larger, the amount of modification can be larger.

When gain Kp common between the case of Δfc>0 and the case of Δfc<0 is used in control calculator 250, only dead band upper limit value fzu and dead band lower limit value −fzl are subjected to variable control described with reference to FIGS. 15 and 16.

Thus, according to the grid control system according to the third embodiment, even when charging or discharging is restricted in at least one of the plurality of power storage systems 10, active power is promptly inputted and outputted in response to occurrence of variation in frequency so that an effect of suppression of frequency variation described in the first and second embodiments can be ensured.

Though power storage systems 10 corresponds to respective feeders in power transmission network 4 in the vicinity of transformer 3 in grid control system 5 shown in FIG. 13, a location where power storage system 10 is provided is not particularly limited. Power storage system 10 can be provided not only in the power transmission network but also in a not-shown power distribution network.

It should be understood that the embodiments disclosed herein are illustrative and non-restrictive in every respect. The technical scope according to the present disclosure is defined by the terms of the claims rather than the description above and is intended to include any modifications within the scope and meaning equivalent to the terms of the claims.

REFERENCE SIGNS LIST 2 power line; 3 transformer; 4 power transmission network; 5 grid control system; 10 power storage system; 20 concentrated control device; 110 power storage device; 120 power converter; 130 voltage detector; 200 control device; 202 CPU; 204 memory; 205 bus; 206 I/O circuit; 210 frequency calculator; 220 high-frequency component removal filter; 230, 290 frequency variation amount calculator; 240 dead band determination unit; 250 control calculator; 260 dynamic limiter; 270 upper and lower limit value setting unit; 280 switching controller; Kp gain; Pc active power; Pcmax charging power upper limit value; Pdmax discharging power upper limit value; Pref active power command value; Prefb power command value (base); Prefmax active power upper limit value; Pt rated value; fdet frequency detection value; fref frequency reference value; ftrg frequency target value; fzl dead band lower limit value; fzu dead band upper limit value

The invention claimed is:

1. A power storage system interconnected to a power grid, the power storage system comprising:
    a power storage device;
    a power converter connected between the power storage device and the power grid to interchange electric power between the power storage device and the power grid; and
    a control device to control active power inputted and outputted between the power grid and the power converter as the power storage device is charged and discharged, wherein
    the control device comprises circuitry configured as
        a frequency detector to calculate a frequency detection value of the power grid,
        a frequency variation amount calculator to calculate an amount of frequency variation in the power grid from the frequency detection value obtained by the frequency detector,
        a control calculator to generate a command value indicating an amount of output of active power for increase in grid frequency or an amount of input of the active power for lowering in grid frequency, in accordance with the amount of frequency variation, and
        a restriction circuit to restrict output of the active power in accordance with the command value when the control calculator generates the command value for output of the active power while the frequency detection value is larger than a predetermined frequency reference value of the power grid, and
    the restriction circuit restricts input of the active power in accordance with the command value when the control calculator generates the command value for input of the active power while the frequency detection value is smaller than the frequency reference value.

2. The power storage system according to claim 1, wherein
    when the control calculator generates the command value for output of the active power while the frequency detection value is larger than the frequency reference value, the restriction circuit prohibits output of the active power from the power converter.

3. The power storage system according to claim 1, wherein
    when the control calculator generates the command value for input of the active power while the frequency detection value is smaller than the frequency reference value, the restriction circuit prohibits input of the active power to the power converter.

4. The power storage system according to claim 1, wherein
    the control device further comprises a filtering circuit to generate a frequency target value obtained by removal of a high-frequency component from the frequency detection value successively calculated by the frequency detector, and when the frequency detection value is larger than the frequency reference value and the frequency detection value is smaller than the frequency target value, the restriction circuit prohibits output of the active power from the power converter.

5. The power storage system according to claim 1, wherein
the control device further comprises a filtering circuit to generate a frequency target value obtained by removal of a high-frequency component from the frequency detection value successively calculated by the frequency detector, and
when the frequency detection value is smaller than the frequency reference value and the frequency detection value is larger than the frequency target value, the restriction circuit prohibits input of the active power to the power converter.

6. The power storage system according to claim 1, wherein
the control device further comprises a filtering circuit to generate a frequency target value obtained by removal of a high-frequency component from the frequency detection value successively calculated by the frequency detector, and
the frequency variation amount calculator calculates the amount of frequency variation by subtracting the frequency detection value obtained by the frequency detector from the frequency target value generated by the filtering circuit.

7. The power storage system according to claim 1, further comprising a filtering circuit to generate a frequency target value obtained by removal of a high-frequency component of the frequency detection value successively calculated by the frequency detector, wherein
while the frequency detection value is larger than the frequency target value,
when the frequency target value is smaller than the frequency reference value, the frequency variation amount calculator calculates the amount of frequency variation by subtracting the frequency detection value from the frequency reference value, whereas
when the frequency target value is equal to or larger than the frequency reference value, the frequency variation amount calculator calculates the amount of frequency variation by subtracting the frequency detection value from the frequency target value.

8. The power storage system according to claim 1, further comprising a filtering circuit to generate a frequency target value obtained by removal of a high-frequency component of the frequency detection value successively calculated by the frequency detector, wherein
while the frequency detection value is smaller than the frequency target value,
when the frequency target value is larger than the frequency reference value, the frequency variation amount calculator calculates the amount of frequency variation by subtracting the frequency detection value from the frequency reference value, whereas
when the frequency target value is equal to or smaller than the frequency reference value, the frequency variation amount calculator calculates the amount of frequency variation by subtracting the frequency detection value from the frequency target value.

9. The power storage system according to claim 1, wherein
the control device further comprises a dead band determination circuit that clears the amount of frequency variation inputted to the control calculator when an absolute value of the amount of frequency variation indicating lowering in frequency is smaller than a first reference value or when an absolute value of the amount of frequency variation indicating increase in frequency is smaller than a second reference value.

10. The power storage system according to claim 1, wherein
the control calculator generates the command value for control of an amount of output of the active power by using the amount of frequency variation indicating lowering in frequency and a first gain, whereas
the control calculator generates the command value for control of an amount of input of the active power by using the amount of frequency variation indicating increase in frequency and a second gain.

11. A grid control system comprising:
a plurality of power storage systems according to claim 1; and
a concentrated control device to control the plurality of power storage systems, wherein
each of the plurality of power storage systems outputs information on charging and discharging restriction on the power storage device to the concentrated control device.

12. The grid control system according to claim 11, wherein
in each of the plurality of power storage systems, the control device further comprises a dead band determination circuit that clears the amount of frequency variation inputted to the control calculator when an absolute value of the amount of frequency variation indicating lowering in frequency is smaller than a first reference value and when an absolute value of the amount of frequency variation indicating increase in frequency is smaller than a second reference value, and
the concentrated control device decreases the first reference value for each of the power storage systems in accordance with decrease in active power that can be outputted to the power grid from the plurality of power storage systems as a whole and decreases the second reference value for each of the power storage systems in accordance with decrease in active power that can be inputted from the power grid in the plurality of power storage systems as a whole, based on the information from each of the plurality of power storage systems.

13. The grid control system according to claim 11, wherein
in each of the plurality of power storage systems, the control calculator included in the control device generates the command value for control of an amount of output of the active power by using the amount of frequency variation indicating lowering in frequency and a first gain whereas the control calculator generates the command value for control of an amount of input of the active power by using the amount of frequency variation indicating increase in frequency and a second gain, and
the concentrated control device increases the first gain for each of the power storage systems in accordance with decrease in active power that can be outputted to the power grid from the plurality of power storage systems as a whole and increases the second gain for each of the power storage systems in accordance with decrease in active power that can be inputted from the power grid to the plurality of power storage systems as a whole, based on the information from each of the plurality of power storage systems.

\* \* \* \* \*